United States Patent
Van De Broek

(10) Patent No.: US 9,744,797 B2
(45) Date of Patent: Aug. 29, 2017

(54) PROJECTION AND COMMUNICATION BOARD AND METHOD FOR MANUFACTURING IT

(71) Applicant: POLYVISION, naamloze vennootschap, Genk (BE)

(72) Inventor: Wout Van De Broek, Hamont-Achel (BE)

(73) Assignee: POLYVISION, NAAMLOZE VENNOOTSCHAP, Genk (BE)

( * ) Notice: Subject to any disclaimer, the term of this patent is extended or adjusted under 35 U.S.C. 154(b) by 163 days.

(21) Appl. No.: 14/727,279

(22) Filed: Jun. 1, 2015

(65) Prior Publication Data

US 2015/0343833 A1 Dec. 3, 2015

(30) Foreign Application Priority Data

Jun. 3, 2014 (BE) .................................. 2014/0426

(51) Int. Cl.
| | |
|---|---|
| *B43L 1/00* | (2006.01) |
| *B05D 5/02* | (2006.01) |
| *G03B 21/60* | (2014.01) |

(52) U.S. Cl.
CPC .............. *B43L 1/002* (2013.01); *B05D 5/02* (2013.01); *B43L 1/00* (2013.01); *G03B 21/60* (2013.01)

(58) Field of Classification Search
CPC .................................... B43L 1/00; B43L 1/002
See application file for complete search history.

(56) References Cited

U.S. PATENT DOCUMENTS

| | | | | |
|---|---|---|---|---|
| 4,123,590 | A | * | 10/1978 | Hasegawa ................ B44D 3/18 427/376.5 |
| 8,470,451 | B2 | | 6/2013 | Hayashi |
| 2009/0155759 | A1 | | 6/2009 | Hayashi |
| 2011/0143330 | A1 | | 6/2011 | Shimada et al. |
| 2013/0216715 | A1 | | 8/2013 | Hayashi |

FOREIGN PATENT DOCUMENTS

| | | |
|---|---|---|
| EP | 1930177 | 6/2008 |
| WO | 2006-119592 | 11/2006 |
| WO | 2010-022342 | 2/2010 |

OTHER PUBLICATIONS

International Search Report, dated Feb. 26, 2015, in corresponding International Patent Application BE 201400426.

* cited by examiner

*Primary Examiner* — Laura Auer
(74) *Attorney, Agent, or Firm* — Young & Thompson

(57) ABSTRACT

Disclosed is a projection and communication board, having a double-sided enamelled steel plate with an enamel undercoat, on which a second white enamel coat is laid on the writing side, which after annealing presents a roughness defined by Ra =0.6-1.2 µm, Rz =3.0-8.0 µm, and R3z =3.0-8.0 µm. On this a third thin finishing coat is applied consisting of enamel powder, more than 90% of which consists of grains of less than 15 µm, and which after annealing presents a roughness defined by Ra =0.4-1.4 µm, Rz =2.0-6.0 µm, and R3z =2.0-6.0 µm.

5 Claims, 3 Drawing Sheets

| L | Ra | σ | Rz | σ | Rt | σ | R3z | σ |
|---|----|---|----|---|----|---|-----|---|
| 5 | 0.839 | 0.091 | 5.359 | 1.022 | 6.358 | 1.123 | 5.016 | 0.860 |
| 6 | 0.925 | 0.118 | 4.426 | 0.378 | 6.3 | 1.078 | 4.415 | 1.135 |

# PROJECTION AND COMMUNICATION BOARD AND METHOD FOR MANUFACTURING IT

FIELD OF THE INVENTION

The present invention relates to a projection and communication board and a method for manufacturing it.

BACKGROUND OF THE INVENTION

Visual communication boards, intended as a writable board, must be properly writable with felt-tip pens or other writing means, but must also be properly dry-wipeable. Dry-wipeable means that the text or symbols applied can be removed without using water or other solvents or cleaning products, and this with repeated use.

A good writable and wipeable communication board has been obtained by providing the board with a smooth, sealed enamelled coating that is so smooth that it is not only properly writable with felt-tip pens or other writing means, but can also be easily wiped with a dry board wiper.

A disadvantage of such enamelled communication boards is that the enamel coat is smooth and consequently shiny such that the board presents inconvenient light reflections from light sources such as the sun or lighting, such that the readability of the communication board is reduced, both for the observer and the optical systems that record an image of the surface in the case of interactive communication boards.

This problem arises in particular when the enamelled writing board also has to be used as a projection board for an image projector, where the light reflections are further strengthened by the necessarily intense light source of the projector.

In order to combat these light reflections, matt enamelled boards have been used as a projection screen, but they are not properly dry-wipeable if they are used as a writing board.

Publication boards have also been developed with an enamelled surface provided with one or more antireflection coats. For example, BE 1.016.588 describes the covering of the enamelled steel surface with one glazed or ceramic antireflection coat, that is applied as a sol-gel dispersion and then annealed at a suitable higher temperature.

For example BE 1.017.572 not only describes the use of one covering layer with a thickness corresponding to one quarter of the wavelength of the spectrum for visible light, but also the use of three covering layers attuned to one another, and this for enamelled communication boards of the interactive type.

Such interactive communication boards of enamelled steel, that make use of an optically readable position-coding pattern have been described in patent BE 1.015.482.

Although projection screens that are more matt are obtained in this way, a price is paid for this in the form of poorer dry-wipeability, which makes these projection boards less suitable for use as a writing board.

To obtain good dry-wipeability, the smoothness of the surface of the board must be as high as possible, while the surface must be as rough as possible for a projection board, in order to diffuse the incident light thereon so as not to cause inconvenient reflections. The combination of both properties thus sets contradictory requirements for the surface of the board.

SUMMARY OF THE INVENTION

The purpose of the present invention is to provide a solution to the aforementioned and other disadvantages by providing a projection and communication board consisting of a double-sided enamelled steel plate with an enamel undercoat, on which a second white enamel coat is laid on the writing side, which after annealing at a temperature above 800° C. presents the following roughness profile when measured according to ISO 4278 and ISO 4288 with a sampling length of 0.8 mm and evaluation length of 4 mm:

| | |
|---|---|
| Ra = | 0.6-1.2 µm |
| Rz = | 3.0-8.0 µm |
| R3z = | 3.0-8.0 µm | and on which a third thin finishing coat is applied consisting of approximately two thirds enamel powder and one third screen-printing medium and whereby more than 90% of the enamel powder consists of grains of less than 15 µm, and which after annealing at a temperature of more than 600° C. presents the following roughness profile when measured according to ISO 4278 and ISO 4288 with a sampling length of 0.8 mm and evaluation length of 4 mm:

| | |
|---|---|
| Ra = | 0.4-1.4 µm |
| Rz = | 2.0-6.0 µm |
| R3z = | 2.0-6.0 µm | and such that this third thin finishing coat obtains an optical roughness such that the incident light is scattered and disruptive light reflections are avoided, while this third coat also ensures a physical smoothness that gives the communication board excellent dry-wipeability.

An advantage of such a projection and communication board is that the board can be used as a writing board because it remains dry-wipeable, even after repeated use, and can also be used as a projection board for presenting images that are projected onto the board by a projector, while in both cases inconvenient light reflections on the surface of the board are absent.

An example of a usable composition for the serigraphic application of the enamel powder in the finishing coat is as follows:

| | |
|---|---|
| Enamel powder | 60% |
| Low viscosity screen-printing medium | 35% |
| High viscosity screen-printing medium | 5% |

Preferably the enamel undercoat has a thickness of 30 to 50 µm and the second white enamel coat has a thickness of 50 to 70 µm, while the finishing coat has a thickness of 5 to 10 µm, measured on a cross-section of the dry finished plate as observed by means of a scanning electron microscope.

The advantage of these coat thicknesses is that due to its granular structure the thin finishing coat has a light-scattering effect and prevents reflections, while this coat nevertheless has the desired dry-wipeability of conventional enamel coats that are applied to wipeable writing boards.

Another advantage is that the thin finishing coat is partially transparent to incident light, such that light refraction and scattering on the underlying rough surface occurs.

Another advantage of these coat thicknesses is that, due to its roughness that differs from the roughness of the finishing coat, the second white enamel coat also contributes to the reflection-resistant properties of the board.

The invention also concerns a method for manufacturing such a projection and communication board that consists of the following steps:
- the double-sided application of the enamel undercoat, affixed by wet coating an aqueous mixture on a steel support;
- the annealing of the enamel undercoat at a temperature of more than 800° C., such that the undercoat with the steel support is fused and attached thereto;
- the application of the second white enamel coat on the writing side of the board by wet coating an aqueous mixture on the already annealed and cooled enamel undercoat;
- the annealing of the second white enamel coat at a temperature of 800° C., such that it adheres to the undercoat;
- the application of a third thin finishing coat on the second enamel coat by screen-printing, whereby a printing paste consisting of approximately two thirds enamel powder and one third screen printing medium is used, whereby at least 90% of the enamel powder grains are smaller than 15 μm, and whereby the printing paste is spread through a screen with a calibre of 57 μm, whereby a paste volume of 15 to 25 cm$^3$/m$^2$ is produced;
- the annealing of the third thin finishing coat at a temperature of 600° C. to 700° C., whereby the finishing coat is attached to the second white enamel coat;
- the cutting of the projection and communication board to the desired dimensions.

The second enamel coat has a composition, which after annealing at 800° C., results in an area with a specific roughness that ensures a matt surface with reflection-resistant properties.

An advantage of the third finishing coat is that it makes the surface of the writing side smoother, which fosters the dry-wipeability, but which due to its granular structure nevertheless preserves antireflection properties that suppress inconvenient light reflections such as those from a projector light source.

The antireflection properties are shown by gloss measurements of the ready-to-use projection and communication board, on which a gloss tolerance of 7.5+/−1.5 GU or less is measured at a measurement angle of 20° and a gloss tolerance of 40+/−5 GU or less measured at a measurement angle of 60°. At a measurement angle of 60° gloss dry-erasable writing surfaces present a value of more than 70 GU.

The screen with a calibre of 57 μm that is used for screen printing the third finishing coat can consist of a mesh of 100 wires per cm, each of 40 μm diameter with the formation of a screen with a thickness of 65 μm, such that a printing paste is spread with a doctor blade.

The composition of the enamel undercoat, the second white enamel coat and the third thin finishing coat contains, in all three coats, silicon oxide, boron oxide, aluminium oxide, potassium oxide and lithium oxide. In addition, the enamel undercoat contains cobalt oxide and nickel oxide, and the second white enamel coat also contains titanium oxide and zirconium oxide, and the third thin finishing coat contains titanium oxide.

The three coats are free of antimony, mercury, cadmium, lead and chromium (VI) compounds.

BRIEF DESCRIPTION OF THE DRAWINGS

With the intention of better showing the characteristics of the invention, a preferred embodiment of a projection and communication board according to the invention is described hereinafter by way of an example, without any limiting nature, with reference to the accompanying drawings, wherein.

DETAILED DESCRIPTION OF THE INVENTION

Figure 1:
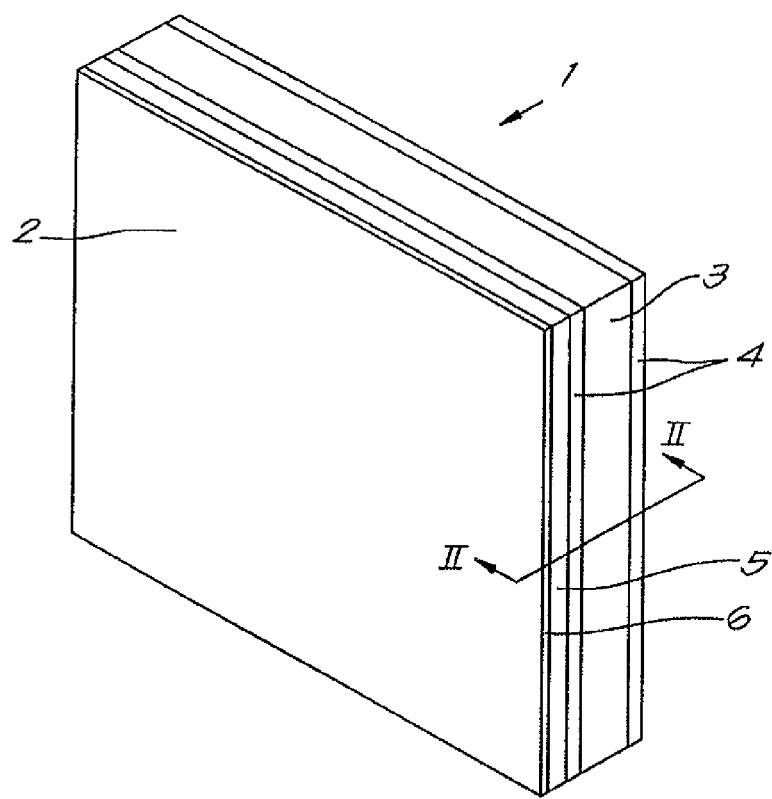
FIG. 1 shows a perspective view of a projection and communication board according to the invention.

FIG. 1 presents a projection and communication board 1 according to the invention, whose writing side 2 is on the left side that is made up of a number of coats, i.e. a steel plate that is provided on the writing side and the back with an enamel undercoat 4, on which a second white enamel coat 5 is affixed on the writing side, over which a third enamel finishing coat 6 is applied that forms the writing surface of the communication board.

Figure 2:
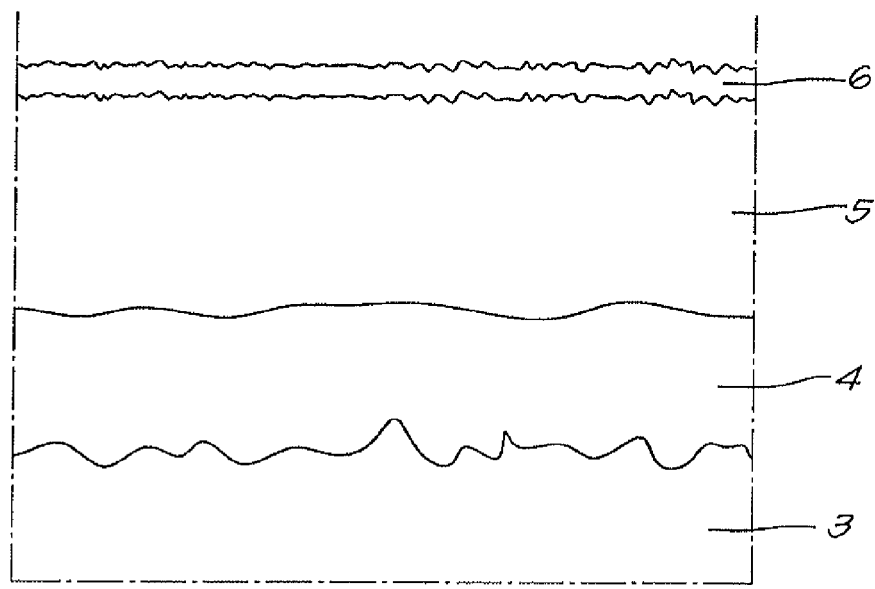
FIG. 2 shows a cross-section of FIG. 1 according to line II-II.

FIG. 2 shows a cross-section of the projection and communication board according to the invention in more detail along line II-II of FIG. 1, which presents a recording by a scanning electron microscope on which the thickness of the third enamel finishing coat 6 can be seen (5 to 10 μm), under which the thickness of the second white enamel coat 5 can be seen (60 μm), and below which the thickness of the enamel undercoat (45 μm), that is attached to a steel plate 3 with a thickness of a few millimetres, can be seen.

Figures 3, 4:
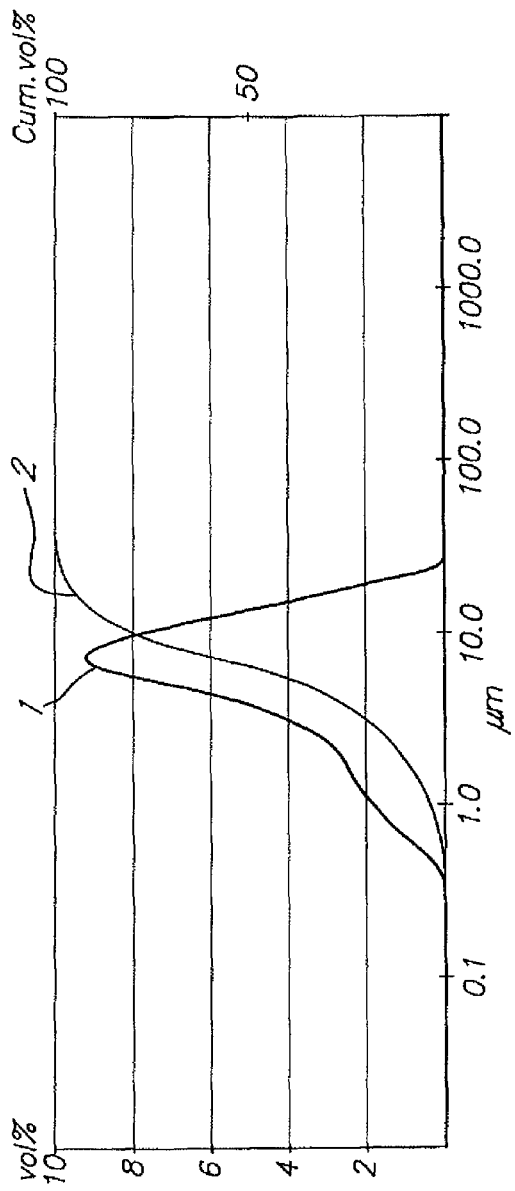
FIG. 3 graphically shows the grain size distribution of the finishing coat according to the invention.
FIG. 4 shows in tabular form the roughness parameters of the second white enamel coat and the finishing coat of the projection and an communication board according to the invention.

FIG. 3 shows a distribution curve of the grain size of the enamel grains that were used in the enamel finishing coat 6 for composing the printing paste with which the finishing coat was applied to the second white enamel coat 5 by screen printing. The curve 1 shows the percentage of the volume (x axis) for each grain size in micrometres on a logarithmic scale (y axis).

The curve 2 shows the cumulative volume in % of all grains smaller than the grain size in micrometres on the y axis. For different percentages of the cumulative volume, the maximum grain size in micrometres is shown in the following table of the grain sizes below which each percentage falls:

| Dv (%) | Max grain size (μm) |
|---|---|
| 10 | 1.40 |
| 50 | 5.71 |
| 90 | 11.40 |
| 97 | 14.20 |
| 98 | 15.10 |
| 99 | 16.20 |

The distribution curve is between 0.3 and 20 μm whereby 98% of the volume of grains presented are smaller than 15 μm. The distribution curve was measured in water (refractive index 1.33) whereby the particles (refractive index 1.54) were determined with a Malvern Mastersizer 3000 particle size analyser according to the MIE scattering model.

FIG. 4 shows the roughness parameters of the second white enamel coat 5 and the finishing coat 6 in tabular form. The roughness parameters were measured with an Alpha-Step Surface Profiler (KLA Tencor) according to ISO 4287 and ISO 4288 with a sample length of 4000 μm and a cut-off value (Lc cut-off value) of 800 μm. The roughness was shown on the basis of the Ra value, the Rz value, the Rt value and the R3z value, always followed by the standard deviation of the measurement. The Ra value is the most generally used one-dimensional parameter for surface roughness and is higher as the roughness increases.

Figure 5:
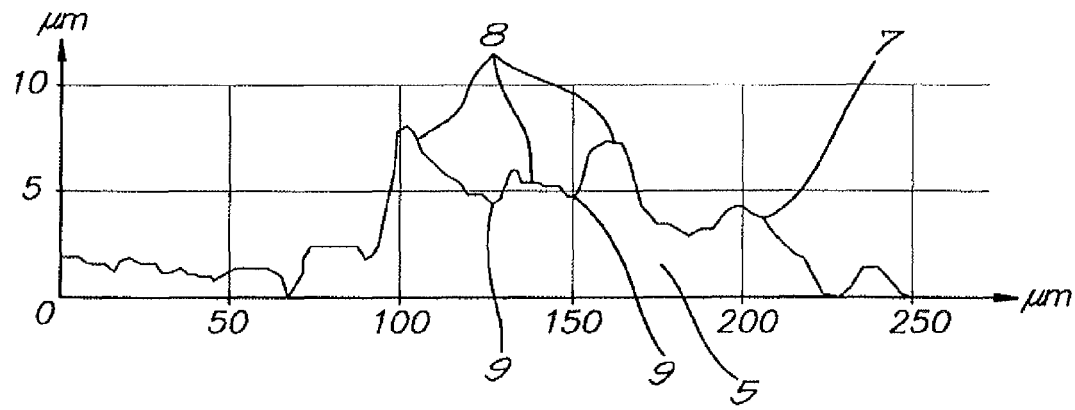
FIG. 5 shows a cross-section profile of the second white enamel coat before the finishing coat is applied to it.

FIG. 5 shows the cross-section profile 7 of a cross-section perpendicular to the surface of the projection and communication board on which the second enamel coat 5 is affixed, but without a third finishing coat. The cross-section profile shows the presence of a number of sharp peaks 8 and deep troughs 9 on the surface, as can be seen on a three-dimensional surface presentation (not shown in the drawings).

Figure 6:
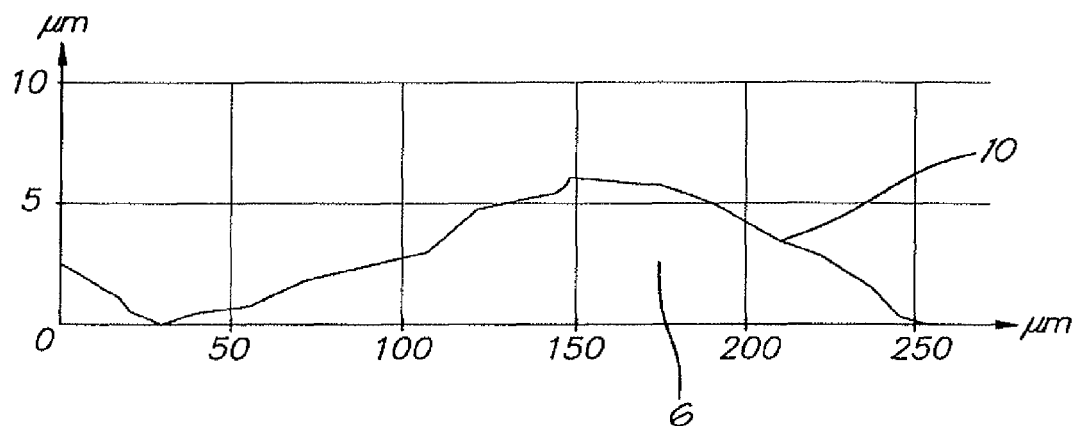
FIG. 6 shows a cross-section profile of the second white enamel coat on which the finishing coat is affixed according to the invention.

FIG. 6 shows the cross-section profile 10 of a cross-section perpendicular to the surface of the projection and communication board according to the invention on which the third coat or finishing coat 6 is affixed, which shows that the sharp peaks and troughs are largely levelled out by the third finishing coat that fills in the troughs and ensures a greater physical smoothness that ensures the dry-wipeability.

This third coat is also partially optically transparent so that incident light can partly go through and is scattered on the rougher surface of the second enamel coat 5, such that inconvenient light reflections on the communication board 1 are suppressed.

The present invention is by no means limited to the embodiment described as an example and shown in the drawings, but a projection and communication board according to the invention can be realised in all kinds of forms and dimensions without departing from the scope of the invention, as described in the claims.

It goes without saying that for the application of the third finishing coat for example, other coating techniques than screen printing can be used such as rotation offset printing or chemical deposition from the gas phase and similar.

The invention claimed is:

1. Projection and communication board, characterised in that it consists of a double-sided enamelled steel plate with an enamel undercoat, on which a second white enamel coat is laid on the writing side, which after annealing presents a roughness of:

| | |
|---|---|
| Ra = | 0.6-1.2 μm |
| Rz = | 3.0-8.0 μm |
| R3z = | 3.0-8.0 μm | and on which a third thin finishing coat is applied consisting of enamel powder, more than 90% of which consists of grains of less than 15 μm, and which after annealing presents a roughness of:

| | |
|---|---|
| Ra = | 0.4-1.4 μm |
| Rz = | 2.0-6.0 μm |
| R3z = | 2.0-6.0 μm. |

2. Projection and communication board according to claim 1, characterised in that the enamel undercoat has a thickness of 30 to 50 μm, the second white enamel coat has a thickness of 50 to 70 μm and the third finishing coat has a thickness of 5 to 10 μm.

3. Projection and communication board according to claim 1, characterised in that the composition of the enamel undercoat, the second white enamel coat and the third thin finishing coat contains silicon oxide, boron oxide, aluminium oxide, potassium oxide and lithium oxide, and in addition cobalt oxide and nickel oxide are also present in the enamel undercoat, and titanium oxide and zirconium oxide are present in the second white enamel coat, and titanium oxide is present in the third thin finishing coat.

4. Projection and communication board according to claim 1, characterised in that the gloss measurements of the ready-to-use projection and communication board indicate a gloss tolerance of 7.5+/−1.5 GU or less at a measurement angle of 20°, and a gloss tolerance of 40+/−5 GU or less at a measurement angle of 60°.

5. Method for manufacturing the projection and communication board of claim 1, characterised in that it consists of the following steps:
the double-sided application of the enamel undercoat by wet coating an aqueous mixture on a steel support;
the annealing of the enamel undercoat at a temperature of more than 800° C., such that the undercoat with the steel support is fused and attached thereto;
the application of the second white enamel coat on the writing side of the board by wet coating an aqueous enamel mixture on the already annealed and cooled enamel undercoat;
the annealing of the second white enamel coat at a temperature of 800° C., such that it adheres to the undercoat;
the application of a third thin finishing coat on the second enamel coat by screen-printing, whereby a printing paste consisting of approximately two thirds enamel powder and one third screen printing medium is used, whereby at least 90% of the enamel powder grains are smaller than 15 μm, spread through a screen with a calibre of 57 μm, whereby a printing paste volume of 15 to 25 cm$^3$/m$^2$ is produced;
the annealing of the third thin finishing coat at a temperature of 600° C. to 700° C., whereby the finishing coat is attached to the second white enamel coat;
the cutting of the projection and communication board to the desired dimensions.

* * * * *